United States Patent Office 3,030,331
Patented Apr. 17, 1962

3,030,331
PROCESS FOR PREPARING COPOLYESTERS COMPRISING REACTING A CARBONYL HALIDE WITH A DICARBOXYLIC ACID AND A DIHYDROXY COMPOUND IN THE PRESENCE OF A TERTIARY AMINE
Eugene P. Goldberg, Pittsfield, Mass., assignor to General Electric Company, a corporation of New York
No Drawing. Filed Aug. 22, 1957, Ser. No. 679,747
16 Claims. (Cl. 260—42)

This invention relates to the preparation of esters by a novel ester synthesis. More specifically, this invention relates to a process for the preparation of linear copolyesters containing both carboxylate and carbonate groups by reacting a carbonyl halide with a difunctional carboxylic acid and a dihydroxy compound. The process is characterized by relatively mild reaction conditions and can be used for the preparation of a wide variety of copolyesters.

Many methods for the preparation of esters are known. Among these are direct esterification by the reaction of a carboxylic acid and a hydroxy compound; ester exchange reactions involving the reaction of an ester with a hydroxy compound; or reactions involving the use of organic acid chlorides or anhydrides with hydroxy compounds. Each of these methods of preparation has certain inherent limitations or shortcomings. Direct esterification and ester exchange methods, for example, require relatively high etmperatures of the order of 200° to 300° C. and high vacuums for obtaining highly polymerized esters. The reaction rates in direct esterification and ester exchange syntheses are relatively slow and it is difficult to obtain high molecular weight polyesters in the absence of long reaction times. The high temperatures necessary promote degradation of reactants and reaction products and, as a result, certain polyesters cannot be prepared by these methods.

The preparation of esters by the use of organic acid chlorides is likewise not entirely satisfactorily because of the fact that acid chlorides are not readily available, are expensive and, in addition, are relatively unstable. Many anhydrides are similarly not readily available and some carboxylic acid anhydrides cannot be prepared at all. In addition, esterification using anhydrides often suffers the disadvantages mentioned above for ester exchange or acid-alcohol condensation.

British Patent 730,599 describes a method of preparing esters by reacting a chlorocarbonic acid ester of a hydroxy compound with a carboxylic acid. The reaction is carried out in the presence of a small amount of a catalyst such as a tertiary amine or a finely divided metal in the absence of a solvent or in the presence of an aqueous solvent. The temperatures of reaction are from about 90° to 160° C. While this process overcomes some of the difficulties previously encountered with ester syntheses, the temperatures of reaction are still of a relatievly high order and moreover, it is still difficult in many cases to obtain high molecular weight polyesters.

The present invention has for its principle object a method of ester synthesis avoiding the problems heretofore encountered in such reactions. More particularly, the process of the present invention enables the preparation of copolyesters by a relatively simple reaction, requiring inexpensive ingredients which reaction is carried out at temperatures below about 75° C. and preferably from 20° to 50° C. Because of the mild reaction conditions, degradative side reactions are substantially eliminated. Moreover there is no evolution of a corrosive gas such as HCl, in the course of the reaction.

Briefly stated, the process of this invention comprises the reaction of a carbonyl halide with a difunctional carboxylic acid and a dihydroxy compound selected from the class consisting of dihydric phenols and glycols, in an organic solvent comprising in excess of two molar equivalents of a tertiary amine for each molar equivalent of carbonyl. The products of the reaction are the desired ester, the tertiary amine halogen acid salt and carbon dioxide. By suitable adjustment of ratios of reactants, copolyesters containing both carbonate

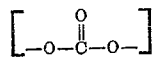

and carboxylate

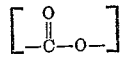

groups can be obtained. The polymerization reactions are carried out by solution polymerization thereby allowing the formation of extremely high molecular weight polymers. The reaction is rapid and the preparation of thermally unstable esters is made possible because of the absence of high temperature reaction conditions.

The haloformate of the hydroxy compound is formed in situ by passing a carbonyl halide illustrated by phosgene or bromophosgene, through a solution of the carboxylic acid and the hydroxy compound. If more than an equivalent amount of hydroxy compound, in comparison with carboxylic acid, is present, a copolyester or mixed monomeric esters (one of which is a carbonate ester) will result if the carboxylic acid itself contains no hydroxy groups. If less than an equivalent amount of hydroxy compound is present, a homopolyester or a monomeric ester will result.

Where the carbonyl halide method is used to form the haloformate in situ, in excess of two molar equivalents of tertiary amine for each molar equivalent of the carbonyl halide is required. This arises from the fact that the carbonyl halide is the precursor of two molar equivalents of halogen acid, the latter being evolved in the course of the reaction.

The hydroxy compounds which may be used are, in general, any mono- or polyhydroxy compounds heretofore used in the preparation of known esters. Thus, the mono- and polyfunctional, saturated and unsaturated, aliphatic, cycloaliphatic, aliphatic-aromatic, aromatic and heterocyclic alcohols and phenols can be employed. Such saturated monohydric alcohols as methyl, ethyl, propyl, butyl, chlorobutyl, etc. alcohols, unsaturated alcohols such as allyl or crotyl alcohol, cycloaliphatic alcohols such as cyclohexanol, polyhydric alcohols such as ethylene glycol, 1,4-butanediol, polyethylene glycol, trimethylene glycol, glycerine, pentaerythritol, sorbitol, or 1,6-hexamethylene glycol, may be used. Other glycols which are useful are disclosed in my copending application S.N. 638,239, filed February 5, 1957, assigned to the same assignee as the present invention. The aromatic hydroxy compounds may be monocyclic or polycyclic aromatic compounds such as phenol, bisphenols, resorcinol, cresols, hydroquinone, pyrogallol, etc. Useful dihydric phenols are also more fully disclosed in my above copending application S.N. 638,239 and in my copending application S.N. 679,743, assigned to the same assignee as the present invention and filed concurrently herewith.

The carboxylic acids, as in the case of the hydroxy compounds, may be any mono or polyfunctional carboxylic acid, it being only necessary that the carboxylic acid contain no olefinic conjugated double bonds. Stated otherwise, the carboxylic acid should be saturated in the alpha, beta position. Monofunctional acids useful in the preparation of simple monomeric esters are formic, acetic, propionic, stearic and phenylacetic acids. Monocarboxylic aromatic acids such as benzoic acid and its homologues, difunctional aromatic acids such as diphenic acid, phthalic acid, terephthalic acid and isophthalic acid, tricarboxylic acids such as citric acid, trimesic acid and other polyfunctional acids may be used. Hydroxy acids, including hydroxybutyric and hydroxybenzoic acid may also be used. Examples of additional difunctional carboxylic acids can be found in my above referred to copending application S.N. 679,743.

The reaction is carried out in a substantially non-aqueous organic solvent system comprising a tertiary amine. Organic solvents which may be used for the preparation of the esters will, in general, be any organic solvent which is inert to the reactants and preferably in which the reactants and the resulting ester are soluble. The solvent may consist entirely of the tertiary amine or it may comprise a tertiary amine in combination with such solvents as benzene, xylene, ethylene dichloride, propylene dichloride, chlorobenzene, toluene, carbon tetrachloride, acetone, chloroform, cyclohexanone, or other well known inert organic solvents. The tertiary amine acts simultaneously as a catalyst, an acid acceptor for the halogen acid, and as a solvent for the polymer. In general, any tertiary amine may be used which is inert to the reaction conditions. It is preferable that it be a polymer solvent, although not essential as the additional solvent may, if present in sufficient quantity, act as polymer solvent. Suitable examples of tertiary amines in addition to pyridine are triethyl, tributyl, and tripropyl amine, quinoline, acridine or dimethylaniline. Mixtures of the foregoing solvents may also be used. Although the quantity of tertiary amine used is important, the amount of other solvent used may be widely varied depending on reactants used, degree of polymerization desired, etc.

The process of the present invention is particularly suitable for the production of the linear copolyesters described in my copending application S.N. 679,743. In accordance with the preferred method of preparing these copolyesters, a carbonyl halide is passed into a tertiary amine-containing solvent solution of the acid and the hydroxy compound. In the case of the linear copolyesters of application S.N. 679,743, the hydroxy compound and acid are both difunctional. Thus the hydroxy compound will be either a glycol or dihydric phenol and the acid will be either a dibasic acid or a difunctional hydroxy acid. If a block copolymer or copolyester is to be prepared, the carbonyl halide is passed into a solution of the hydroxy compound alone or the hydroxy compound and the acid, after which additional hydroxy compound or additional acid is added, followed by further addition of carbonyl halide to a viscous end point. Alternatively, other block copolymers may be prepared by separately adding phosgene to a solution of the acid and hydroxy compound in one reaction vessel, adding carbonyl halide to a solution of the hydroxy compound in a second reaction vessel, mixing the two, thus formed prepolymers and adding phosgene to the mixture to form the final block copolymer.

In order that those skilled in the art may better understand how the process of the present invention may be carried out, the following examples are given by way of illustration and not by way of limitation.

*Example 1*

To a 1-liter flask equipped with stirrer, thermometer and gas inlet tube was added 0.17 mol (38.8 grams) of bisphenol-A, 0.17 mol (24.8 grams) of adipic acid and 470 cc. of pyridine. Phosgene was bubbled into the stirred solution maintained at 25° to 35° C. until the mixture became viscous. The polymer was then precipitated, washed with isopropanol and dried. The resulting polymer poly(bisphenol-A adipate) had an intrinsic viscosity of 0.20.

Examples 2 through 13 are illustrative of the preparation of random carbonate-carboxylate copolyesters. In each of these examples, phosgene was bubbled into a stirred pyridine solution (470 cc. pyridine) of a difunctional acid and a dihydric phenol maintained at 25–35° C. Phosgene was added until the reaction mixture became viscous. The method of isolating and purifying the polymer was as in Example 1.

*Example 2*

The following reactants were used:

Bisphenol-A _____ 0.18 mol (41.2 grams)
Adipic acid _____ 0.085 (12.4 grams)
Phosgene, ca _____ 0.34 mol (33.7 grams)

The properties of the copolyester were as follows:

Intrinsic viscosity _____ 1.1
Softening temperature (° C.) _____ 140–230

*Example 3*

The following reactants were used:

Bisphenol-A _____ 0.17 mol (38.8 grams)
Isophthalic acid _____ 0.085 mol (14.1 grams)
Phosgene, ca _____ 0.33 mol (32.7 grams)

The properties of the resulting copolyester were as follows:

Intrinsic viscosity _____ .93
Softening temperature (° C.) _____ 225–255

*Example 4*

The following reactants were used:

Bisphenol-A _____ 0.17 mol (38.8 grams)
Azelaic acid _____ 0.085 mol (16 grams)
Phosgene, ca _____ 0.30 mol (29.7 grams)

The properties of the resulting copolyester were as follows:

Intrinsic viscosity _____ 0.88
Softening temperature (° C.) _____ 125–185

*Example 5*

The following reactants were used:

Bisphenol-A _____ 0.17 mol (38.8 grams)
Terephthalic acid _____ 0.085 mol (14.1 grams)
Phosgene, ca _____ 0.26 mol (25.7 grams)

The properties of the resulting copolyester were as follows:

Intrinsic viscosity _____ 0.96
Softening temperature (° C.) _____ 315–365

*Example 6*

Prepared as in Example 2, using 10.0 g. (0.091 mol) of resorcinol and 6.9 g. (0.047 mol) of adipic acid in 75 cc. of pyridine. The copolyester softened at 40–50° C. and had an intrinsic viscosity of 0.20.

*Example 7*

Prepared as in Example 2, using 9.7 g. (0.048 mol) of 4,4'-dihydroxydiphenyl ether and 4.6 g. (0.024 mol) of isophthalic acid in 75 cc. of pyridine. The copolyester had an intrinsic viscosity of 0.46 and a softening temperature of 145–160° C. It was only slightly soluble in dioxane or methylene chloride.

*Example 8*

Prepared as in Example 2, using 10.0 g. (0.092 mol) hydroquinone and 6.9 g. (0.047 mol) adipic acid in 75 cc. of pyridine. The copolyester was insoluble in methylene chloride, tetrachloroethane, dioxane and benzene. It was swollen by pyridine, acetone and dimethylsulfoxide.

*Example 9*

Prepared as in Example 2, using 10.0 g. (0.040 mol) 4,4'-dihydroxydiphenyl sulfone and 2.9 g. (0.020 mol) adipic acid in 75 cc. of pyridine. The copolyester was soluble in methylene chloride and dioxane and had a softening temperature of 135–145° C.

Examples 10 and 11 illustrate the preparation of copolyesters using 3,6-endomethylene-Δ-4-tetrahydrophthalic acid, commercially known as "Nadic" acid, as the difunctional acid. This acid has the structure

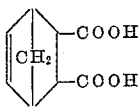

In each case copolyesters were prepared as in Example 2 by bubbling phosgene into a pyridine solution of the acid and bisphenol-A.

*Example 10*

This example utilized a four to one molar ratio of bisphenol-A to Nadic acid. The properties of the copolymer were as follows:

Intrinsic viscosity_____ 0.57
Softening temperature (° C.)_____ 165–180

*Example 11*

Example 10 was repeated using a two to one molar ratio of bisphenol-A to Nadic acid. The copolyester had a softening temperature of 175–195° C.

*Example 12*

This and the following example illustrate the preparation of a copolyester using a sulfur containing acid as the difunctional acid.

A copolyester was prepared as in Example 2 using a fifty to one molar ratio of bisphenol-A to acid. The acid used was thiodiglycollic acid having the structure

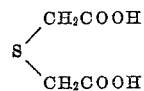

The intrinsic viscosity of the resulting copolyester was 0.78 and the softening temperature was 210–225° C.

*Example 13*

Example 12 was repeated using a four to one molar ratio of bisphenol-A to acid. The intrinsic viscosity of the copolyester was 0.37 and the softening temperature was 140–170° C.

Examples 14 through 17 illustrate the preparation of block carbonate-carboxylate copolyesters.

*Example 14*

Bisphenol-A, 0.17 mol (38.8 grams), and 0.17 mol (24.8 grams) of adipic acid were dissolved in 470 cc. of pyridine. About 25% of the theoretical amount of phosgene was bubbled into the solution. More bisphenol-A, 0.17 mol (38.8 grams), was then added with additional phosgene until a viscous end point was obtained. The polyester was precipitated and washed in the same manner as Example 6 and the following properties were obtained.

Intrinsic viscosity_____ 0.93
Softening temperature (° C.)_____ 105–145

*Example 15*

The same amounts of the same reactants were used as in Example 14 above. The procedure followed was likewise the same except that phosgene was added to the initial bisphenol-A adipic acid solution until the solution was viscous. The remainder of the bisphenol-A was then added in 470 cc. of additional pyridine and phosgene again added to a viscous end point. The intrinsic viscosity of the copolyester was 0.98 and the softening temperature was 125–155° C.

*Example 16*

Bisphenol-A, 0.17 mol (38.8 g.), was dissolved in 470 cc. pyridine and phosgene was bubbled into the stirred solution until viscous. Adipic acid, 0.085 mol (12.4 g.), was added in 470 cc. of pyridine and the addition of phosgene continued until very viscous. The polyester was precipitated and washed as above and had the following properties:

Intrinsic viscosity_____ 0.83
Softening temperature (° C.)_____ 155–175

*Example 17*

In separate reaction vessels, phosgene was added to 0.17 mol each of bisphenol-A and adipic acid and to 0.17 mol of bisphenol-A, both in 470 cc. of pyridine solution. When both reaction mixtures had become viscous, the bisphenol-A reaction mixture was poured into the bisphenol-A-adipic acid mixture. After stirring for 15 minutes, a small amount of additional phosgene (0.3 gram/minute for two minutes) promoted a very viscous end point. The precipitated and washed copolyester had a softening temperature of 95–120° C.

Examples 18 and 19 illustrate the preparation of copolyesters using hydroxy acids.

*Example 18*

A 20 cc. solution of 10% by weight p-hydroxybenzoic acid in pyridine and an 80 cc. solution of 10% by weight bisphenol-A in pyridine were prepared and mixed. Phosgene was bubbled into the reaction mixture until a viscous end point was obtained. A clear strong film of the precipitated and washed copolyester (7540 p.s.i. tensile strength) was cast from methylene chloride solution.

*Example 19*

Example 18 was repeated using 30 cc. of the 10% p-hydroxybenzoic acid solution and 70 cc. of the 10% bisphenol-A solution. The resin had an intrinsic viscosity of 0.83 and a softening temperature of 230–250° C.

The process of this invention may be used for the preparation of the copolyester compositions described and claimed in my copending application S.N. 679,743. Linear polyesters prepared in accordance with the invention find wide utility for the manufacture of films, fibers, molded or extruded parts and surface coatings for use in structural, decorative and electrical applications. The linear copolyesters may be used for applications more fully set out in said copending application S.N. 679,743.

What I claim as new and desire to secure by Letters Patent of the United States is:

1. A process for the preparation of linear copolyesters containing both carboxylate and carbonate groups comprising reacting a carbonyl halide with a difunctional carboxylic acid, and in excess of a molar equivalent in comparison with the carboxylic acid, of a dihydroxy compound selected from the class consisting of dihydric phenols and glycols, in a substantially non-aqueous solution comprising an organic solvent containing in excess of two molar equivalents of a tertiary amine for each molar equivalent of carbonyl halide, said reaction being carried out at a temperature below 75° C.

2. The process of claim 1 in which the carbonyl halide is phosgene.

3. The process of claim 1 in which the tertiary amine is pyridine.

4. A process for the preparation of linear copolyesters containing both carboxylate and carbonate groups comprising reacting phosgene with a dibasic carboxylic acid, and in excess of a molar equivalent of a dihydric phenol in comparison with the carboxylic acid, in a substantially nonaqueous solution comprising an organic solvent containing in excess of two molar equivalents of pyridine for each molar equivalent of phosgene, said reaction being carried out at a temperature below 75° C.

5. The process of claim 1 in which the carboxylic acid is adipic acid.

6. The process of claim 1 in which the carboxylic acid is isophthalic acid.

7. The process of claim 1 in which the carboxylic acid is terephthalic acid.

8. The process of claim 1 in which the carboxylic acid is azelaic acid.

9. The process of claim 1 in which the carboxylic acid is p-hydroxybenzoic acid.

10. The process of claim 1 in which the dihydric phenol is 2,2-bis(4-hydroxyphenyl)-propane.

11. The process of claim 1 in which the dihydric phenol is 4,4'-dihydroxydiphenyl ether.

12. The process of claim 1 in which the dihydric phenol is 4,4'-dihydroxydiphenyl sulfone.

13. A process for the preparation of block copolyesters comprising the sequential steps of (1) passing a carbonyl halide into a solution of a dihydric phenol, said solution comprising an organic solvent containing in excess of two molar equivalents of a tertiary amine for each molar equivalent of carbonyl halide, (2) adding a difunctional carboxylic acid to the solution and (3) passing additional phosgene into the solution, said steps being carried out at a temperature below 75° C.

14. A process for the preparation of block copolyesters comprising the sequential steps of (1) passing a carbonyl halide into a solution of a dihydric phenol and a difunctional carboxylic acid, said solution comprising an organic solvent containing in excess of two molar equivalents of a tertiary amine for each molar equivalent of carbonyl halide, (2) adding additional dihydric phenol to the solution and (3) passing additional phosgene into the solution, said steps being carried out at a temperature below 75° C.

15. A process for the preparation of block copolyesters comprising the steps of (1) passing a carbonyl halide through a solution of a difunctional carboxylic acid and a dihydric phenol, said solution comprising an organic solvent containing in excess of two molar equivalents of a tertiary amine for each molar equivalent of carbonyl halide, (2) separately, passing a carbonyl halide into a solution of a dihydric phenol, said solution comprising an organic solvent containing in excess of two molar equivalents of a tertiary amine for each molar equivalent of carbonyl halide, (3) mixing the solutions resulting from steps (1) and (2), and (4) passing additional carbonyl halide into the mixture, said steps being carried out at a temperature below 75° C.

16. A process for the preparation of high molecular weight linear copolyesters containing both carboxylate and carbonate groups which comprises reacting phosgene with a difunctional carboxylic acid, and in excess of a molar equivalent in comparison with the carboxylic acid, of a dihydric phenol, in a substantially non-aqueous solution comprising an organic solvent containing in excess of two molar equivalents of a tertiary amine for each molar equivalent of phosgene.

References Cited in the file of this patent

UNITED STATES PATENTS

| | | |
|---|---|---|
| 2,517,965 | Bohl | Aug. 8, 1950 |

FOREIGN PATENTS

| | | |
|---|---|---|
| 730,599 | Great Britain | May 25, 1955 |
| 1,005,514 | France | Dec. 26, 1951 |
| 507,569 | Canada | Nov. 23, 1954 |